United States Patent [19]

Heid et al.

[11] 4,252,533
[45] Feb. 24, 1981

[54] SULPHUR DYESTUFFS WHICH ARE READY FOR DYEING, AND PROCESSES FOR DYEING AND PRINTING WITH SULPHUR DYESTUFFS

[75] Inventors: Christian Heid; Konrad Mix; Heinz Dickmanns; Erwin Krusche, all of Frankfurt am Main, Fed. Rep. of Germany

[73] Assignee: Cassella Aktiengesellschaft, Frankfurt am Main, Fed. Rep. of Germany

[21] Appl. No.: 123,670

[22] Filed: Feb. 22, 1980

[30] Foreign Application Priority Data

Mar. 24, 1979 [DE] Fed. Rep. of Germany ....... 2911720

[51] Int. Cl.³ .......................... C09B 49/00; D06P 1/30
[52] U.S. Cl. ............................................. 8/587; 8/652
[58] Field of Search ..................................... 8/587, 652

[56] References Cited

U.S. PATENT DOCUMENTS

| 2,130,415 | 9/1938 | Buchanan | 8/521 |
| 2,558,245 | 6/1951 | Grant | 8/652 |
| 3,329,477 | 7/1967 | Mason et al. | 8/652 |
| 3,645,665 | 2/1972 | Etters | 8/652 |
| 3,798,172 | 3/1974 | Etters | 8/652 |

Primary Examiner—A. Lionel Clingman
Attorney, Agent, or Firm—Connolly and Hutz

[57] ABSTRACT

Dyeing and printing with sulfur dyestuffs involves dissolving the dyestuff by reduction. The dissolved reduced dyestuff is applied to the material to be dyed or printed and the dyestuff is reconverted into in soluble dyestuff by oxidation. The present invention improves the prior art by using as the dyestuff reducing agent a compound of the formula

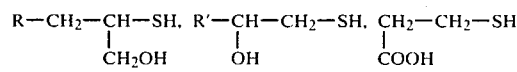

or an alkali metal salt thereof, wherein R is —H or —OH and R' is —H, —CH₃ or —CH₂OH.

10 Claims, No Drawings

SULPHUR DYESTUFFS WHICH ARE READY FOR DYEING, AND PROCESSES FOR DYEING AND PRINTING WITH SULPHUR DYESTUFFS

For dyeing and printing, sulphur dyestuffs must first be dissolved by reduction. The reduction products, called leuco-dyestuffs are absorbed onto cellulosic fibres and are then reconverted into the insoluble sulphur dyestuffs again by oxidation. Sodium sulphide, sodium hydrosulphide (sodium bisulphide), ammonium sulphide, hydrosulphite (dithionite), hydrosulphite-aldehyde compounds and glucose are known, for example, for the reduction of the sulphur dyestuffs. In industrial dyeing practice, sodium sulphide or sodium hydrosulphide is preferably used. Hydrosulphite and sodium hydroxymethanesulphonate destroy a number of sulphur dyestuffs by over-reduction and are thus suitable only to a limited extent, above all for so-called sulphur vat dyestuffs.

Glucose and other sugars, such as fructose and invert sugar, reduce sulphur dyestuffs only at relatively high temperatures, so that an optimum colour yield is possible only above 95° C. Since such temperatures cannot be achieved in all existing dyeing apparatuses, the suitability of glucose and other sugars as reducing agents for sulphur dyestuffs is also not unlimited. In the present state of dyeing technology, there is no reducing agent available for sulphur dyestuffs which is equivalent to sodium sulphide or sodium hydrosulphate over the entire range of application. However, further use of reducing agents containing sulphide is jeopardised with the increasingly stricter efforts to protect the environment. In many cases, the laws to be expected with regard to maintaining the purity of water and air even exclude the use of alkali metal sulphide and alkali metal hydrosulphide.

A process for dyeing and printing with sulphur dyestuffs is also known (German Patent Specification No. 743,566) in which mercapto compounds are used as reducing agents. In addition to mercapto compounds, disulphide compounds or compounds which are converted into mercapto compounds under the dyeing or printing conditions can also be employed. Suitable compounds which are mentioned are: the sodium salts of thioglycolic acid, dithioglycolic acid and thiosalicic acid, and pseudosulphohydantoin (a condensation compound of thiourea and monochloroacetic acid), and the condensation compounds of acetone and thioglycolic acid and of benzaldehyde and sodium thioglycolate. The compounds mentioned reduce sulphur dyestuffs in virtually the same manner as alkali metal sulphide, but, with the exception of thiosalicic acid, which is of no value industrially, they liberate sulphide during vatting in an alkaline liquor, as is indicated in German Patent Specification No. 743,566, using the example of thioglycolic acid or its corresponding disulphide compound:

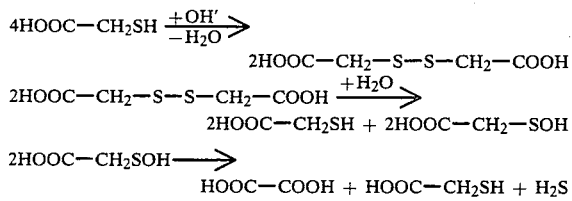

Thus, 3 mols of mercaptan and 1 mol of hydrogen sulphide are formed from 4 mols of mercapto compound or 2 mols of disulphide, the mercaptan formed reacting again until it is converted completely into hydrogen sulphide.

This means that hydrogen sulphide is formed when the mercapto compounds or disulphide compounds indicated in German Patent Specification No. 743,566 are used, so that in this respect there is no advantage compared with the use of sulphidic reducing agents. Furthermore, the advantages of using the mercapto compounds or disulphide compounds indicated are only that, on the one hand, it provides possibilities for vatting in a more weakly alkaline range, compared with the use of sodium sulphide, and on the other hand, compared with the use of sodium formaldehydesulphoxylate or hydrosulphite, milder vatting without overreduction is possible. Ecological points of view in connection with reducing agents for sulphur dyestuffs, such as, for example, biological degradability, toxicity or pollution of water and air, are not taken into consideration in German Patent Specification No. 743,566.

It has now been found that if mercapto compounds are used as reducing agents for sulphur dyestuffs, no hydrogen sulphide is formed if a compound of the formula

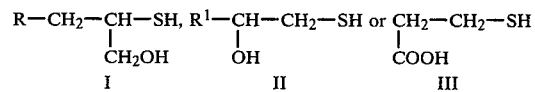

wherein R denotes —H or —OH and $R^1$ denotes H, —$CH_3$ or —$CH_2OH$, or an alkali metal salt thereof, is used.

The invention accordingly relates to a process for dyeing and printing with sulphur dyestuffs using mercapto compounds as reducing agents, which is characterised in that a compound of the formula I, II or III indicated above or an alkali metal salt thereof is used as the reducing agent. The invention also relates to a process for the production of liquid sulphur dyestuff preparations, in which the sulphur dyestuffs are treated with a compound of the formula I, II or III, and the sulphur dyestuff preparations thus produced.

The compounds of the formulae I, II and III, that is to say 2-mercapto-1-propanol, 2-mercapto-1,3-propanediol, ⊕-mercaptoethanol, 3-mercapto-2-propanol, 3-mercapto-1,2-propanediol (thioglycerol) and β-mercaptopropionic acid, are known. If their alkali metal salts exist, they can also be employed in the form of these salts. The compounds and their salts reduce sulphur dyestuffs in the same manner as alkali metal sulphide. Dyeings of the same intensity and with the same fastness properties are obtained. Over-reduction, as in the case of hydrosulphite or sodium hydroxymethanesulphonate, does not occur. The dyeing possibility extends over a pH range from 9 to 14 without hydrogen sulphide, which pollutes the air and constitutes an odour nuisance, being liberated. Likewise, virtually no sulphide can be detected in the dyehouse effluent, even after slight acidification. In contrast to bactericidal alkali metal sulphide, the compounds of the formulae I, II and III are also biologically degradable.

The amount of the compounds I, II or III required for reduction of the sulphur dyestuffs is usually 0.2 to 3 times the weight of dyestuff, depending on the particular dyestuff. Mixtures of compounds of the formulae I, II and III and their salts can also be used as reducing agents for sulphur dyestuffs. The reducing agents mentioned can also be used as mixtures with other reducing agents which are effective for sulphur dyestuffs. Examples of such other reducing agents are sodium dithionite and sugars, such as glucose, fructose and invert sugar. Synergistic reduction effects can frequently be detected in combinations with various reducing agents, especially in combinations with the β-mercaptoethanol ($R^1$=H in formula II), which is also preferably used as the sole reducing agent. The abovementioned reducing agent combinations are only slightly toxic and are biologically degradable and thus acceptable in the effluent.

The dyeings are produced in the customary manner, for example by the pad-steam process or from a long liquor. The dye liquor is prepared with the addition of the reducing agents to be used according to the invention, and the required pH value of 9 to 14, preferably 10.5 to 12.5, is in general established by adding sodium hydroxide solution.

All the known water-insoluble and water-soluble sulphur dyestuffs and all the known sulphur vat dyestuffs can be employed for dyeing and printing using the reducing agents to be used according to the invention.

Examples of water-insoluble sulphur dyestuffs are: Sulphur Yellow 9 C.I. 53 010, Sulphur Brown 15 C.I. 53 270, Sulphur Brown 26 C.I. 53 090, Sulphur Brown 20 C.I. 53 680, Sulphur Brown 10 C.I. 53 055, Sulphur Red 6 C.I. 53 720, Sulphur Red 12, Sulphur Black 1 C.I. 53 185, Sulphur Blue 11 C.I. 53 235, Sulphur Yellow 20, Sulphur Green 8 C.I. 53 175, Sulphur Brown 52 C.I. 53 320, Sulphur Brown 38 C.I. 53 100 and Sulphur Brown 16 C.I. 53 280.

Examples of water-soluble sulphur dyestuffs (sodium saltsof the thiosulphuric acids of sulphur dyestuffs) are: Sol. Sulphur Blue 7 C.I. 53 441, Sol.Sulphur Brown 15 C.I. 53 271, Sol. Sulphur Yellow 2 C.I. 53 121, Sol.Sulphur Brown 10 C.I. 53 056, Sol.Sulphur Blue 7 C.I. 53 441, Sol.Sulphur Blue 10 C.I. 53 471, Sol.Sulphur Brown 16 C.I. 53 286, Sol. Sulphur Brown 51 C.I. 53 328, Sol.Sulphur Brown 60 C.I. 53 326, Sol.Sulphur Green 2 C.I. 53 572, Sol.Sulphur Brown 52 C.I. 53 321, Sol.Sulphur Green 9 C.I. 53 006, Sol.Sulphur Red 6 C.I. 53 723 and Sol.Sulphur Brown 1 C.I. 53 001.

Examples of sulphur vat dyestuffs are: Vat Blue 43 C.I. 53 630, Vat Blue 42 C.I. 53 640, Sulphur Black 11 C.I. 53 290, Sulphur Black 6 C.I. 53 295 and Sulphur Black 7 C.I. 53 300.

The reducing agents to be used according to the invention are suitable not only for carrying out the dyeing and printing operation with sulphur dyestuffs and sulphur vat dyestuffs, but also for the production of liquid dyestuff preparations, which are ready for dyeing, of the dyestuffs mentioned. Such liquid dyestuff preparations which are ready for dyeing, using sodium sulphides and sodium bisulphide as the reducing agents, are known from U.S. Pat. No. 2,130,415. Instead of the toxic sodium sulphide and hydrosulphide, the mercapto compounds, to be used as reducing agents according to the invention, of the formulae I, II and III and their salts are utilised, by themselves or as mixtures with one another, and if appropriate also as mixtures with other reducing agents, such as sodium dithionite and/or sugars, for the preparation of the liquid dyestuff formulations which are ready for dyeing. For this preparation, a sulphur dyestuff (water-soluble or water-insoluble sulphur dyestuffs or sulphur vat dyestuffs or a mixture of these dyestuffs) is stirred with a reducing agent or reducing agent mixture to be used according to the invention in a weight ratio of 1:(0.1 to 2), preferably 1:(0.2 to 1), at pH values from 9 to 14, preferably 10.5 to 12.5 if appropriate in the presence of a dispersing agent, until the sulphur dyestuff has been reduced completely. This reduction usually takes place at temperatures of 20° to 180° C., preferably at 40° to 80° C. In general, sodium hydroxide solution is utilised to establish the pH value. After cooling, the sulphur dyestuff is present in a stable form which is ready for dyeing. The concentration of dyestuff in the stable liquid dyestuff formulation can be about 10 to 45%. The stable dyestuff formulations which are ready for dyeing can be admixed to the dye liquor by simple dilution. No toxic hydrogen sulphide gas can be liberated from the dye liquors, even in the case of unintended addition of acid before or after carrying out the dyeing. The operating safety is thus considerably increased using the vatting agents to be employed according to the invention and pollution of the environment is reduced, without it being necessary to forego the advantages of relatively easy handling of the liquid dyestuff preparation and of the relatively low pH value.

EXAMPLE 1

34 g of Sol.Sulphur Brown 15 C.I. 53 271, 72 g of Sol. Sulphur Red 6 C.I. 53 723, 45 g of Hydrosol-Orangebraun RR and 22 g of Sol.Sulphur Black 1 C.I. 53 186 are sprinkled into 500 ml of water of 50° C. and dissolved, whilst stirring. Thereafter, 25 ml of sodium hydroxide solution of 38° Bé strength and 55 ml of β-mercaptoethanol (an approximately 47% strength aqueous solution of the sodium salt) are added and the solution is made up to 1,000 ml with cold water.

The solution is then warmed to 25° to 30° C. and is used to pad cotton velvet. The padded cotton velvet is steamed at 103° C. for 1 minute, rinsed with cold and warm water (50° C.) and then oxidised for 2 minutes in an oxidation bath which contains 1.5 g/l of potassium bichromate and 4 ml/l of acetic acid and has a pH value of 4 to 5. Finally, the velvet is rinsed with hot and cold water. A very deep brown results. No troublesome odour is noticeable during dyeing, rinsing and acid oxidation. Sulphide cannot be detected in the rinsing water.

EXAMPLE 2

60 g of Hydron-Blau R Stabilosol, liquid (Vat Blue 43 C.I. 53 630) are diluted with 500 ml of cold water and, after adding 20 ml of sodium hydroxide solution of 38° Bé strength and 30 ml of β-mercaptoethanol (an approximately 47% strength aqueous solution of the sodium salt), the solution is made up to 1,000 ml with water. Cotton fabric is padded with this solution at 25° to 30° C. and is finished as described under Example 1. The resulting dyeing corresponds to the dyeing which results in the customary manner, using sodium hydroxide solution/hydrosulphide.

EXAMPLE 3

5 g of Immedial-Carbon CBO, concentrated (Sulphur Black 1 C.I. 53 185) are boiled with 100 ml of water, 5 ml of sodium hydroxide solution of 38° Bé strength and 5 ml of β-mercaptoethanol (an approximately 47% strength aqueous solution of the sodium salt) and the solution is then made up to 250 ml with water. 5 g of sodium sulphate are added to this solution. 50 g of cotton fabric are dyed at 90° C. for 60 minutes in the dye liquor thus prepared (liquor ratio 1:5), on a laboratory jig. The fabric is then rinsed and subsequently oxidised at 80° C. for 15 minutes with an oxidation solution which contains 1.5 g/l of potassium bichromate and 4 ml/l of 60% strength acetic acid. After a final rinsing with hot water, a black with the customary depth of colour and normal level of fastness is obtained.

EXAMPLE 4

1.5 g of Immedial-Lichtbrillantgrün BBL (Sulphur Green 25) are dissolved in 500 ml of water, to which 3 ml of sodium hydroxide solution of 38° Bé strength and 3 ml of β-mercaptoethanol (an approximately 47% strength aqueous solution of the sodium salt) are added beforehand. After adding 10 g of sodium sulphate, 20 g of cotton yarn are dyed at 90° C. for 60 minutes in this dye liquor (liquor ratio 1:25), on a laboratory jig. The yarn is then rinsed and subsequently oxidised at 80° for 10 minutes with an oxidation solution which contains 1.5 g/l of potassium bichromate and 4 ml/l of 60% strength acetic acid. After a final rinsing with hot water, a dyeing of the usual depth and fastness is obtained. If hydrosulphide were used as the reducing agent, the dyestuff would be destroyed by over-reduction.

EXAMPLE 5

400 g of the colour base Sulphur Brown 51 C.I. 53 327, obtained by sulphurising hexanitrodecacyclene by the baking method, are stirred with about 900 ml of water of 65° C., and 125 g of β-mercaptoethanol are added. The batch is then brought to a pH value of 12 to 13 by adding concentrated sodium hydroxide solution and is stirred at 65° C. for 3 hours. A concentrated liquid dyestuff preparation which is ready for dyeing and stable on storage is obtained.

A similar preparation is obtained if, instead of the β-mercaptoethanol, an approximately equimolar amount of one of the other mercapto compounds according to the invention is used.

EXAMPLE 6

230 g of colour base Sulphur Blue 10 C.I. 53 470, obtained by sulphurising N-[p-(p-hydroxyanilino)-phenyl]-sulphanilic acid by the boiling method, are stirred with 1.5 l of water, if appropriate with the addition of a commercially available dispersing agent, and 160 g of β-mercaptoethanol are added. The pH value is then adjusted to 10 to 11 with concentrated sodium hydroxide solution and the mixture is stirred at 60° to 80° C. until a solution is obtained, the pH value being kept constant.

A liquid dyestuff preparation which is ready for dyeing and stable on storage is obtained.

EXAMPLE 7

200 g of the liquid dyestuff preparation of Sulphur Brown 51 described in Example 5 are made up to 1,000 ml with cold water. Cotton fabric is padded with this solution. The temperature of the padding liquor is 20° to 30° C. The fabric, which has been impregnated with dyestuff solution, is steamed at 103° C. for 1 minute and then rinsed and oxidised at 80° C. with 1 g/l of potassium bichromate in 3 ml of 60% strength acetic acid. A dyeing is obtained, the depth of colour and fastness properties of which correspond to those of a dyeing which is produced with the commercial dyestuff Immedial Lichtbraun GGL using sodium sulphide.

EXAMPLE 8

Two dye liquors which each contained 80 g of Sol.-Sulphur Black 1 C.I. 53 186 in 1 l were prepared. 80 g of 60% strength concentrated sodium sulphide were added to one dye liquor and 20 ml of sodium hydroxide solution of 38° Bé strength and 80 ml of β-mercaptoethanol (in the form of a 47% strength aqueous solution of the sodium salt) were added to the other dye liquor. The dye liquors were then warmed to 80° C. and kept at this temperature for 1 hour, air being excluded. Thereafter, the sulphide ion concentrations in the two dye liquors were determined analytically. In the case of the dye liquor to which sodium sulphide had been added, 1.15% of $S^{2-}$ was found, and in the case of the dye liquor to which β-mercaptoethanol had been added, less than $1.10^{-3}\%$ of $S^{2-}$ was found.

We claim:

1. In the process for dyeing and printing with sulphur dyestuffs using mercapto compounds as the required reducing agent, the improvement comprises the reducing agent being a compound of the formula

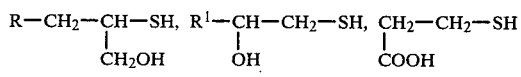

or an alkali metal salt thereof wherein R is —H or —OH and $R^1$ is —H, —CH$_3$ or —CH$_2$OH.

2. The process according to claim 1 wherein the amount of reducing agent is 0.2 to 3 times the weight of dyestuff.

3. The process according to claim 1 wherein said reducing agent is mixed with sodium dithionite, glucose, fructose or invert sugar.

4. The process according to claim 3 wherein β-mercaptoethanol is said reducing agent.

5. The process for the preparation of stable sulphur dyestuff formulations ready for dyeing comprising treating a sulphur dyestuff in water at a pH of 9 to 14 and at a temperature of 20° to 80° C. with a compound of the formula

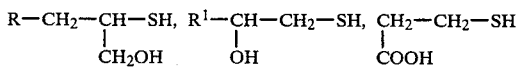

or an alkali metal salt thereof wherein R is —H or —OH and $R^1$ is —H, —CH$_3$ or —CH$_2$OH, until the sulphur dyestuff has been completely reduced.

6. The process according to claim 5 wherein the pH is 10.5 to 12.5.

7. The process according to claim 5 wherein the temperature is 40° to 80° C.

8. The process according to claim 5 wherein the weight ratio of said reducing agent to dyestuff is 0.1 to 2 parts reducing agent per part of dyestuff.

9. The process according to claim 8 wherein the weight ratio of dyestuff:reducing agent is 1:(0.2 to 1).

10. Liquid, stable sulphur dyestuff formulation ready for dyeing prepared by the process according to claim 5 and having a dyestuff content of 10 to 45%.

* * * * *